US009494933B1

(12) United States Patent
Jackson (10) Patent No.: US 9,494,933 B1
(45) Date of Patent: Nov. 15, 2016

(54) PROCESSING PACKETS IN AN AIRCRAFT NETWORK DATA PROCESSING SYSTEM

(75) Inventor: Timothy E. Jackson, Arlington, WA (US)

(73) Assignee: THE BOEING COMPANY, Chicago, IL (US)

( * ) Notice: Subject to any disclaimer, the term of this patent is extended or adjusted under 35 U.S.C. 154(b) by 663 days.

(21) Appl. No.: 12/488,249

(22) Filed: Jun. 19, 2009

(51) Int. Cl.
| | |
|---|---|
| *G05B 23/02* | (2006.01) |
| *H04L 12/24* | (2006.01) |
| *H04L 12/751* | (2013.01) |
| *H04L 12/741* | (2013.01) |
| H04L 12/707 | (2013.01) |
| H04L 12/717 | (2013.01) |
| H04L 29/06 | (2006.01) |

(52) U.S. Cl.
CPC ....... *G05B 23/0221* (2013.01); *G05B 23/0229* (2013.01); *H04L 41/00* (2013.01); *H04L 45/02* (2013.01); *H04L 45/74* (2013.01); H04L 45/22 (2013.01); H04L 45/42 (2013.01); H04L 69/22 (2013.01)

(58) Field of Classification Search
CPC ...................................................... H04L 45/74
USPC ....... 370/217, 241, 250, 347, 350, 389, 390, 370/395.4, 442, 503; 710/100, 106, 107, 710/110; 701/2, 3, 35; 379/394
See application file for complete search history.

(56) References Cited

U.S. PATENT DOCUMENTS

| | | | | |
|---|---|---|---|---|
| 4,270,168 A | * | 5/1981 | Murphy ............... | G05D 1/0077 714/10 |
| 4,907,228 A | * | 3/1990 | Bruckert ............... | G06F 11/165 714/11 |
| 5,349,654 A | * | 9/1994 | Bond ...................... | G06F 11/08 714/4.5 |
| 5,432,895 A | * | 7/1995 | Myers ..................... | G06T 15/10 345/419 |
| 5,798,726 A | * | 8/1998 | Schuchman ......... | G08G 5/0013 342/32 |
| 5,809,220 A | * | 9/1998 | Morrison ................. | G05B 9/03 714/12 |
| 5,883,586 A | * | 3/1999 | Tran ....................... | G01C 23/00 340/945 |
| 6,014,381 A | * | 1/2000 | Troxel ............. | H04L 12/40058 348/E7.05 |
| 6,052,733 A | * | 4/2000 | Mahalingam et al. ....... | 709/235 |
| 6,467,003 B1 | * | 10/2002 | Doerenberg et al. ......... | 710/117 |
| 6,860,452 B2 | * | 3/2005 | Bacon .................. | G05D 1/0077 244/194 |
| 6,925,088 B1 | * | 8/2005 | Moreaux ................. | H04L 12/44 370/400 |
| 7,039,008 B1 | * | 5/2006 | Howes ............. | H04L 29/12009 370/220 |

(Continued)

*Primary Examiner* — Andrew Lai
*Assistant Examiner* — Andrew C Lee
(74) *Attorney, Agent, or Firm* — Yee & Associates, P.C.

(57) ABSTRACT

A method, data processing system, and computer program product for processing packets in an aircraft network data processing system. A number of first packets of data are received from each redundant network in a plurality of redundant networks in the aircraft network data processing system. A number of second packets of data generated by a redundancy manager are received in communication with the plurality of redundant networks. Then, a configuration of the plurality of redundant networks is identified using the number of first packets and the number of second packets.

16 Claims, 4 Drawing Sheets

(56) References Cited

U.S. PATENT DOCUMENTS

| | | | |
|---|---|---|---|
| 7,203,615 B2 * | 4/2007 | Mao | B64D 43/00 370/392 |
| 7,206,877 B1 * | 4/2007 | Doerenberg et al. | 710/100 |
| 7,406,050 B2 | 7/2008 | Calluaud et al. | |
| 7,505,400 B2 * | 3/2009 | Bibby et al. | 370/217 |
| 7,535,907 B2 * | 5/2009 | Hussain et al. | 370/392 |
| 7,565,463 B2 * | 7/2009 | Johnsen et al. | 710/30 |
| 7,675,919 B2 * | 3/2010 | Vestal | 370/395.4 |
| 7,787,486 B2 * | 8/2010 | Vestal | 370/442 |
| 7,792,046 B2 * | 9/2010 | Kucharczyk et al. | 370/244 |
| 7,817,539 B2 * | 10/2010 | Lysne et al. | 370/219 |
| 7,839,768 B2 * | 11/2010 | Leary et al. | 370/219 |
| 7,877,627 B1 * | 1/2011 | Freydel | G06F 11/1633 714/11 |
| 8,077,709 B2 * | 12/2011 | Cai et al. | 370/389 |
| 8,284,674 B2 * | 10/2012 | True | H04B 7/18506 370/238 |
| 8,296,494 B1 * | 10/2012 | Sheffield | G06F 13/4282 370/489 |
| 8,856,508 B2 * | 10/2014 | Genissel | G06F 21/31 713/150 |
| 8,868,726 B1 * | 10/2014 | Tu | H04L 67/32 709/223 |
| 2003/0058136 A1 * | 3/2003 | Hedrick | G01C 23/00 340/973 |
| 2004/0160944 A1 * | 8/2004 | Saint Etienne et al. | 370/351 |
| 2004/0208116 A1 * | 10/2004 | Saint Etienne et al. | 370/216 |
| 2005/0065669 A1 * | 3/2005 | Roux et al. | 701/3 |
| 2005/0080551 A1 * | 4/2005 | Ledingham | G06Q 10/025 701/120 |
| 2005/0220029 A1 * | 10/2005 | Calluaud | H04L 12/2697 370/241 |
| 2006/0062143 A1 * | 3/2006 | Bibby | G05D 1/0077 370/225 |
| 2006/0107108 A1 * | 5/2006 | Geng et al. | 714/11 |
| 2006/0203721 A1 * | 9/2006 | Hsieh et al. | 370/229 |
| 2006/0215568 A1 * | 9/2006 | Smith | 370/241 |
| 2006/0253613 A1 * | 11/2006 | Leary et al. | 709/250 |
| 2007/0127521 A1 | 6/2007 | Sandell et al. | |
| 2007/0164166 A1 * | 7/2007 | Hirvonen | B64C 13/42 244/175 |
| 2007/0230429 A1 * | 10/2007 | Sannino | H04L 12/40019 370/342 |
| 2008/0155513 A1 * | 6/2008 | Ling et al. | 717/135 |
| 2008/0239973 A1 * | 10/2008 | Cabaret et al. | 370/250 |
| 2009/0073984 A1 * | 3/2009 | Jackson | 370/394 |
| 2009/0086641 A1 * | 4/2009 | Mushtaq et al. | 370/241.1 |
| 2010/0025544 A1 * | 2/2010 | Beaufrere | G05D 1/0077 244/76 R |
| 2010/0312835 A1 * | 12/2010 | Garay et al. | 709/206 |

* cited by examiner

PROCESSING PACKETS IN AN AIRCRAFT NETWORK DATA PROCESSING SYSTEM

BACKGROUND INFORMATION

1. Field

The present disclosure relates generally to interfacing between network components having different protocols and in particular to processing packets of data between devices connected to network data buses. Still, more particularly, the present disclosure relates a method and apparatus for monitoring a network data processing system and processing packets of data for errors and network configuration between components connected to data networks.

2. Background

Aeronautical Radio Inc. 664 (ARINC 664) is a standard for an avionics data network used in aircraft including commercial and transport aircraft. The ARINC 664 defines physical and electrical interfaces of a data network and data protocol for an aircraft's local area network. The ARINC 664 standard is based on the IEEE 802.3 standard and uses commercial off-the-shelf hardware. The Avionics Full Duplex Switched Ethernet (AFDX) network is built on the ARINC 664 standard. AFDX uses a switch tied to a number of end systems or line replaceable units. Each end system may be bridged using other switches on the network. AFDX also provides dual redundancy to increase availability on connectionless datagram communication. AFDX uses less wiring than previous networks. Since AFDX is full duplex, data can travel across a single wire in both directions, as opposed to the previous systems where two lines were used, one for each direction, in a simplex configuration.

AFDX uses a special protocol to provide deterministic timing and redundancy management. The deterministic timing allows for data to be transmitted between different systems within a specified time. To accomplish the timing, the amount of data per transmission is limited. AFDX comprises a data or logical link layer, network layer, transport layer, and application layer. AFDX also utilizes virtual links. Virtual links provide a unidirectional logic path from end system to end system instead of a normal Ethernet switch which routes packets of data based on machine access code address. AFDX routes packets of data using a virtual link identifier. A virtual link identifier is a 16-bit unsigned integer value that follows a constant 32-bit data field.

Virtual links are used by a network switch for three functions. Routing data packets, traffic policing, and size policing. Traffic policing may be, for example, monitoring network traffic in conformance with particular settings. For example, each virtual link has a "bandwidth allocation gap". If a data packet with a particular virtual link is received in a period less than the specified bandwidth allocation gap, the switch does not forward the data packet to any configured port. Size policing may be, for example, measuring the minimum and maximum frame size of a particular data packet and only forwarding the packet if it is within the specified tolerance for a particular virtual link.

Currently, accessing and testing the AFDX network requires the use of proprietary hardware and software. The current software is used in combination with an application programming interface designed for the proprietary hardware and software. In addition to having to use the proprietary hardware and software, which are costly, these systems do not provide all desired capabilities. Since the systems are proprietary, it is difficult to alter them to provide additional capabilities.

Thus, it would be advantageous to have a method and apparatus that takes into account at least some of the issues discussed above, as well as possibly other issues.

SUMMARY

In one advantageous embodiment, a method is present for processing packets in an aircraft network data processing system. A number of first packets of data are received from each redundant network in a plurality of redundant networks in the aircraft network data processing system. A number of second packets of data generated by a redundancy manager are received in communication with the plurality of redundant networks. Then, a configuration of the plurality of redundant networks is identified using the number of first packets and the number of second packets.

In another advantageous embodiment, an apparatus comprises a bus; a memory connected to the bus; and a processor unit connected to the bus, wherein the processor unit configured to receive a number of first packets of data from each redundant network in a plurality of redundant networks in the aircraft network data processing system; receive a number of second packets of data generated by a redundancy manager in communication with the plurality of redundant networks; and identify a configuration of the plurality of redundant networks using the number of first packets and the number of second packets.

In another advantageous embodiment, a computer program product comprises a computer recordable storage medium; program code, stored on the computer recordable storage medium, for receiving a number of first packets of data from each redundant network in a plurality of redundant networks in the aircraft network data processing system; program code, stored on the computer recordable storage medium, for receiving a number of second packets of data generated by a redundancy manager in communication with the plurality of redundant networks; and program code, stored on the computer recordable storage medium, for identifying a configuration of the plurality of redundant networks using the number of first packets and the number of second packets.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
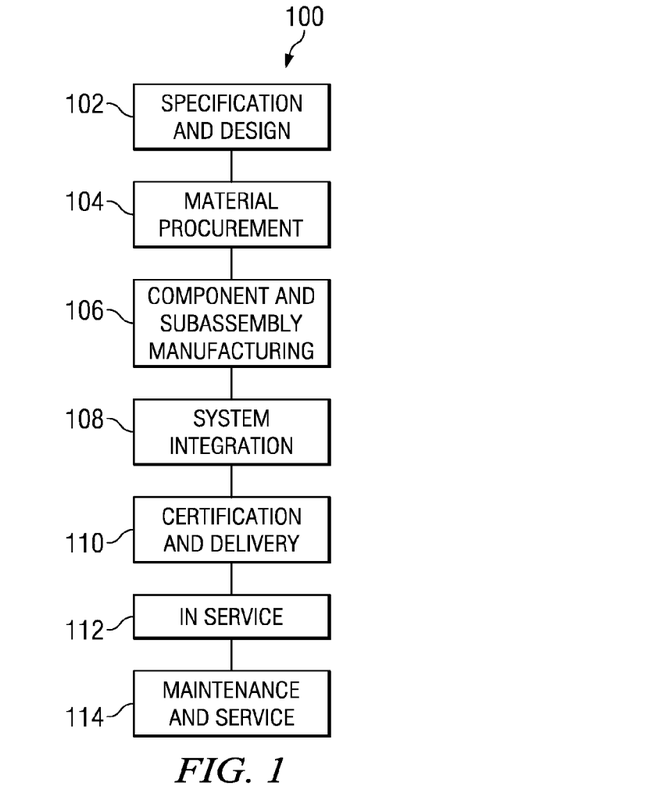
FIG. 1 is an illustration of an aircraft manufacturing and service method in which an advantageous embodiment may be implemented.
Figure 2:
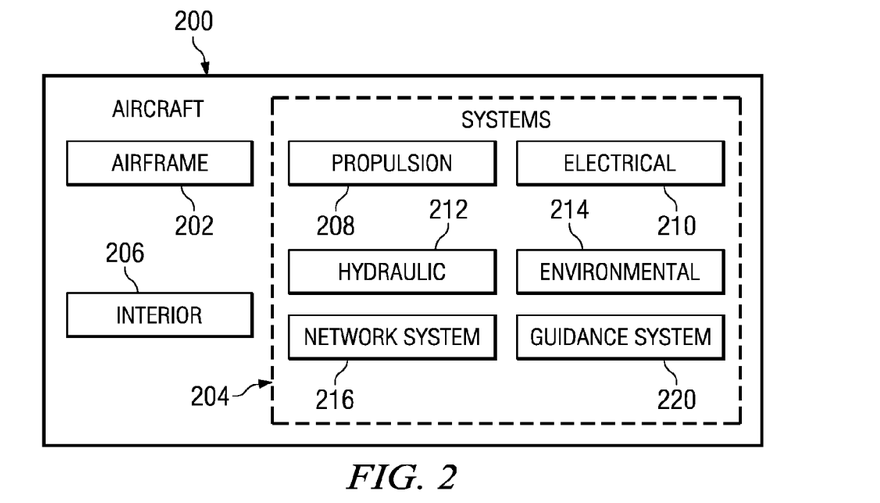
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, illustrative aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with systems 204 and interior 206. Examples of systems 204 include one or more of propulsion system 208, electrical system 210, hydraulic system 212, environmental system 214, network system 216, and guidance system 220. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 of FIG. 2 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of, or reducing the cost of, aircraft 200. Similarly, one or more of apparatus embodiments, method embodiments, or a combination thereof may be utilized while aircraft 200 is in service 112 or during maintenance and service 114 in FIG. 1.

As another example, one or more of the different advantageous embodiments may be used to manufacture parts for use in aircraft 200 during component and subassembly manufacturing 106 and/or maintenance and service 114. For example, network environment 300 may be used during specification and design 102 to help design a configuration for a network. Additionally, network environment 300 may be used in system integration 108 to help integrate a network in aircraft 200. Additionally, network environment 300 may be used during service 112 and/or maintenance and service 114 to diagnose inconsistencies with network system 216 in aircraft 200.

The different advantageous embodiments recognize and take into account a number of considerations. For example, the different advantageous embodiments recognize and take into account that with current proprietary hardware and software solutions, there is a lack of ability to customize the components.

Further, the different advantageous embodiments also recognized that current software comprises a protocol stack tied to a specific hardware implementation. As a result, proprietary components and software are costly. Proprietary components are components designed by companies to restrict control of the components to other components of the company and of the same proprietary format. For example, a proprietary component in a network communicates with other proprietary components because each component is equipped to handle the same protocol and/or interface. For example, a proprietary software application can function with a proprietary piece of hardware of the same type of proprietary system.

A method, data processing system, and computer program product for processing packets in an aircraft network data processing system. A number of first packets of data are received from each redundant network in a plurality of redundant networks in the aircraft network data processing system. A number of second packets of data generated by a redundancy manager are received in communication with the plurality of redundant networks. Then, a configuration of the plurality of redundant networks is identified using the number of first packets and the number of second packets.

Figure 3:
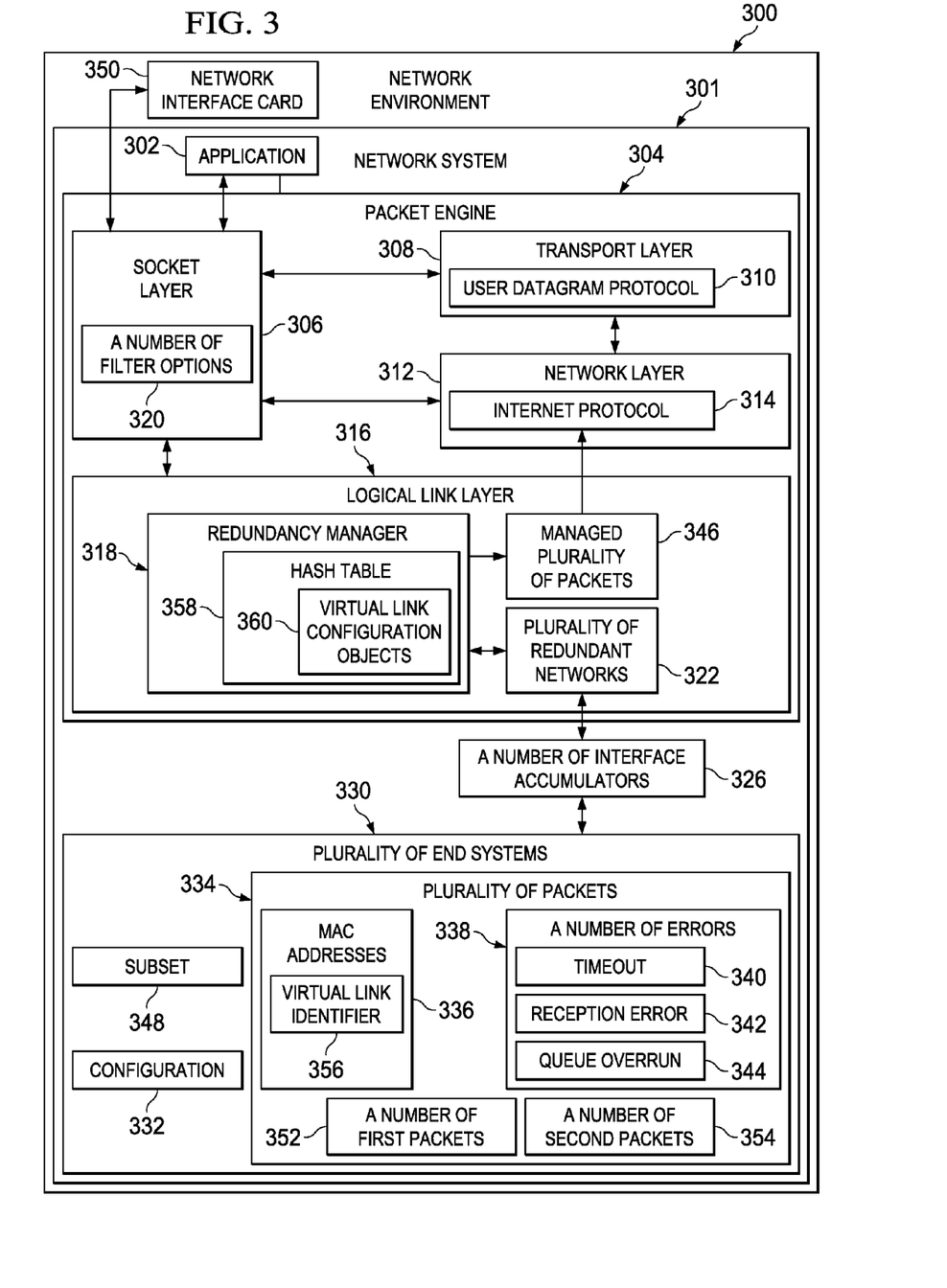
FIG. 3 is a block diagram of a network environment in accordance with an advantageous embodiment.

With reference to FIG. 3, a block diagram of a network environment is depicted in accordance with an advantageous embodiment. In these examples, network system 301 is one example of one implementation of a network system such as, for example, network system 216 as shown in FIG. 2.

In this illustrative example, network environment 300 comprises network system 301 and network interface card 350. In this advantageous embodiment, network system 301 comprises application 302, packet engine 304, and plurality of end systems 330.

Application 302 may be a task that is to be implemented on network system 301. Application 302 may be an end system of plurality of end systems 330, a program operating on a data processing system accessing network system 301 through a network interface card, such as network interface card 350, and/or another type of application operating on network system 301. Application 302 communicates with transport layer 308.

In one or more advantageous embodiments, packet engine 304 is type of protocol stack. Packet engine 304 comprises socket layer 306, transport layer 308, network layer 312, and logical link layer 316.

A protocol stack is a particular implantation of a data processing network protocol suite. In some advantageous embodiments, packet engine 304 may be the Boeing Common Data Network Protocol Packet Engine. In other advantageous embodiments, packet engine 304 adheres to the avionics full duplex switched Ethernet protocol standard.

In one or more advantageous embodiments, plurality of end systems 330 are hardware systems associated with network system 301. A first component may be considered to be associated with a second component by being secured to the second component, bonded to the second component, fastened to the second component, and/or connected to the second component in some other suitable manner. The first component may also be considered to be associated with the second component by being formed as part of, and/or an extension of, the second component.

In other advantageous embodiments, plurality of end systems 330 are line-replaceable units. A line-replaceable unit is a component of a vehicle, such as an airplane, ship, or spacecraft. Line-replaceable units may comply with, a standard, such as, for example, an Aeronautical Radio Inc. standard.

Plurality of end systems 330 communicate with each other through network system 301. Plurality of end systems 330 comprises configuration 332, subset 348, and plurality of packets 334.

Configuration 332 is a configuration of network system 301 including plurality of end systems 330 throughout. Configuration 332 may show which end systems of plurality of end systems 330 are associated with network system 301 and the type of end system. For example, configuration 332 may show that there are five end systems associated with network 301 and one of them is a wing unit.

Subset 348 is a subset of plurality of end systems 330. Subset 348 may be selected by the use of a number of filter options 320. For example, if the number of filter options 320 is set to accept packets from a specific machine access code address, subset 348 will be any end system associated with the specific machine access code address.

In these illustrative examples, plurality of packets 334 is the packets of data that may be transmitted by plurality of end systems 330. Plurality of packets 334 comprises machine access code address (MAC) 336. Machine access code addresses 336 are identifiers assigned to network adapters associated with data processing system hardware. Machine access code addresses 336 may comprise virtual link identifiers 356. Virtual link identifiers 356 identify a logic path from a source end system to a destination end system.

Plurality of packets 334 contains information. Information may be, for example, without limitation, data, programs, commands, logs, and/or suitable information. As another example, plurality of packets 334 may contain information in the form of a number of errors 338. The number of errors 338 in plurality of packets 334 may be caused by timeout 340, reception error 342, queue overrun 344 and/or other events.

In one or more advantageous embodiments, socket layer 306 is a network socket. Socket layer 306 communicates with a network system, such as network system 301. Socket layer 306 may be an application programming interface in an operating system. Socket layer 306 may communicate and/or bind with transport layer 308, network layer 312, and logical link layer 316.

Socket layer 306 comprises a number of filter options 320. The number of filter options 320 allows filtering of network system 301 while receiving packets of data selecting a virtual link identifier, internet protocol address, and/or user datagram protocol.

Socket layer 306 may bind at the logical link layer 316 above and below redundancy manager 318 in the protocol stack. For example, socket layer 306 may bind to logical link layer 316 above redundancy manager 318 and receive packets of data after they have been through redundancy manager 318. Additionally, socket layer may bind to logical link layer 316 below redundancy manager 318 where packets are received before they have been received or discarded by redundancy manager 318. Redundancy manager 318 may discard data packets violating machine access code destination, source, frame length, cyclic redundancy check, alignment, receive rate errors, and other types of errors. Redundancy manager 318 may also discard duplicate frames. Additionally, redundancy manager 318 may comprise hash table 358. Hash table 358 comprises virtual link configuration object 360. Hash table 358 uses map keys to identify virtual links. For example, "right rudder" may be mapped to a certain virtual link using a hash table. Virtual link configuration object 360 stores information about a virtual link, such as, but not limited to, the virtual link identifier, maximum and minimum frame size measured, and bandwidth allocation gap value.

Transport layer 308 combines data into units for transmission across a network system, such as network system 301. Transport layer 308 comprises user datagram protocol 310. User datagram protocol 310 does not confirm receipt of packets of data. In other advantageous embodiments, transport layer 308 may comprise other types of transport protocol, such as, but not limited to, transmission control protocol, stream control transmission protocol, and/or datagram congestion control protocol.

Network layer 312 transfers data through the use of network addresses. Network layer 312 may also be referred to as "internet layer." Network layer 312 comprises internet protocol 314. Internet protocol 314 is a type of protocol for assigning specific addresses to different components of a network. In other advantageous embodiments, network layer 312 may comprise other types of network layer protocols, such as, but not limited to, internet control message protocol and/or internet group management protocol. Network layer 312 transmits and receives managed plurality of packets 346 from redundancy manager 318.

Logical link layer 316 comprises managed plurality of packets 346, redundancy manager 318, and plurality of redundant networks 322. In one or more advantageous embodiments, there are two independent network systems. In other advantageous embodiments, there may be more than two network systems up to as many network systems that may be needed. Each network of plurality of redundant networks 322 is independent from each other. When network systems are independent none of the components and/or wiring are interrelated. Independent network systems may use the same hardware or different hardware. Also, independent network systems may have the same timing or different timing. Even though logical link layer 316 shows redundancy manager 318 directly connected to plurality of redundant networks 322, there may be other components between the networks and redundancy manager 318. Such as, for example, integrity checking. Integrity checking checks that sequence numbers in successive packets of data from a network are in order. Integrity checking may be done by each virtual link and each network. Any packets which are invalid are discarded. "Packets", as use herein may also be referred to as "frames" of data.

Plurality of redundant networks 322 receives streams of data from a number of interface accumulators 326. The number of interface accumulators 326 combine streams of data from plurality of end systems 330, other Ethernet machine code addresses, simulated packet streams, and packet capture files.

When packets, such as a number of first packets 352 and/or a number of second packets 354, reach redundancy manager 318, the packets are managed to produce managed plurality of packets 346. To manage packets of data, redundancy manager 318 takes the first valid packet and discards the second redundant valid packet. In different advantageous embodiments, redundancy manager 318 may hold both sets of packets, send both sets of packets, discard the first redundant valid packet while sending the second redundant valid packet, and/or send both sets of packets.

In this advantageous embodiment, network interface card 350 is a commercial-off-the-shelf network interface card. Network interface card 350 accesses network system 301 through socket layer 306. Network interface card 350 may bind with any layer of packet engine 304, including transport layer 308, network layer 312, and logical link layer 316.

Figure 4:
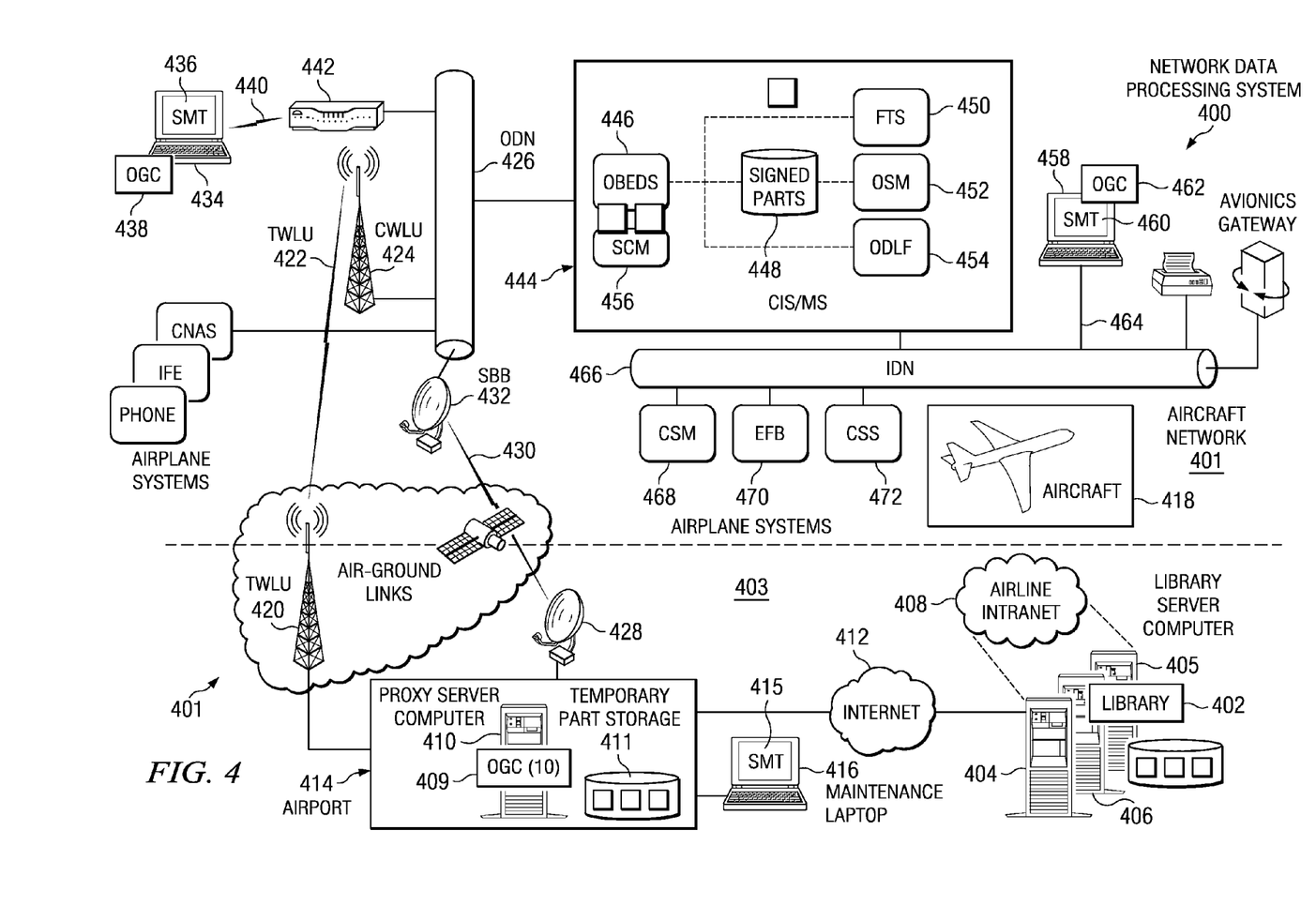
FIG. 4 is a diagram of a data processing environment in accordance with an illustrative embodiment.

Turning now to FIG. 4, a diagram illustrating a network data processing system in which a software part management environment may be implemented is depicted in accordance with an advantageous embodiment. In this example, network data processing system 400 is a network data processing system in which information may be transferred between aircraft network 401 and ground network 403. Network data processing system 400 may be one illustrative embodiment of network system 301 of FIG. 3. This information may include, for example, without limitation, commands, aircraft software parts, downlink data, error logs, usage history, flight data, status information, and manuals. Ground network 403 includes networks and computers located on the ground. Aircraft network system 401 is a network and computers located on an aircraft.

In these examples, commands may be generated on library 402 located on library server computer 404. Library server computer 404 and other data processing systems, such as server computers 404 and 406, connect to intranet 408.

These commands may be distributed to on ground component (OGC) 409 on proxy server computer 410 through a network, such as Internet 412. Intranet 408 and Internet 412 may include connections such as, for example, wires, fiber optic cables, or wireless communications links. Proxy server computer 410 may be located in a facility, such as airport 414. Proxy servers, such as proxy server computer 410, may be located at other airports and other locations, such as maintenance locations. Proxy server computer 410 provides for temporary part storage 411 for commands and parts received from library 402.

The commands and aircraft software parts also may be sent to software maintenance tools on portable computers, such as software maintenance tool 415 on maintenance laptop 416. Proxy server computer 410 and maintenance laptop 416 are referred to collectively as ground tools. A ground tool may be any data processing system that is configured with an appropriate application to transfer information, such as commands, aircraft software parts, and downlink data.

Proxy server computer 410 may connect to aircraft 418 through various types of connections or links. For example, wireless unit 420 may establish wireless connection 422 with wireless unit 424 on aircraft 418. Wireless unit 424 connects to open data network 426 in aircraft 418. Maintenance laptop 434 has software maintenance tool 436 and on ground component (OGC) 438 and may communicate with aircraft 418 establishing communications link 440 with cabin wireless access unit 442. Communications link 440 is a wireless virtual private network tunnel. Cabin wireless access unit 442 connects to open data network 426 in these examples. Open data network 426 provides an interface for various communications links, such as wireless link 422. Additionally, satellite unit 428 connected to proxy server computer 410 at airport 414 may establish satellite link 430 with satellite unit 432, which is also connected to open data network 426.

Open data network 426 connects to aircraft data processing system 444, which contains onboard electronic distribution system (OBEDS) 446. Storage device 448 also is located in aircraft data processing system 444. Storage device 448 provides a location to store information, such as aircraft parts. Aircraft data processing system 444 also includes file transfer system (FTS) 450, onboard storage manager (OSM) 452, onboard data load function (ODLF) 454, and signer-crater module (SCM) 456. In these examples, signer-crater module 456 may be implemented as a Java® library compiled into onboard electronic distribution system 446. Also, aircraft data processing system 444 may take the form of a crew information system/maintenance system computer.

File transfer system 450 is used to transfer files from storage device 448 to a line replaceable unit. File transfer system 450 may be one illustrative embodiment of packet engine 304 as shown in FIG. 3. Onboard storage manager 452 manages information stored in storage device 448. Onboard data load function 454 is a software component used to load aircraft software parts onto line replaceable units. Signer-crater module 456 is used to process incoming crates and store the contents of those crates in storage device 448. Additionally, signer-crater module 456 may crate download data for downloading to proxy server computer 410.

All command processing, in these examples, is initiated by onboard electronic distribution system 446 located in aircraft data processing system 444. Onboard electronic distribution system 446 monitors the air-to-ground link status and determines whether a communications link has been established. If a link becomes available, onboard electronic distribution system 446 connects to a ground data processing system via the link.

In other advantageous embodiments, maintenance laptop 458 may establish communications link 464 with isolated data network 466. Maintenance laptop 458 has software maintenance tool 460 and on ground component 462. Communications link 464 may be a wired connection. The line replaceable units may be, for example, central server module (CSM) 468, electronic flight bag (EFB) 470, and cabin services system (CSS) 472. Central server module 468 provides common networking functions for the different networks in aircraft 418. These services include, for example, packet routing, firewall, and wireless access. Cabin services system 472 provides applications to control systems in the aircraft, such as lighting, cabin doors, and address system. Maintenance laptop 458 may comprise network interface card 350 as shown in FIG. 3.

If onboard electronic distribution system 446 establishes a connection to a ground device, onboard electronic distribution system 446 requests a list of commands queued or stored for aircraft 418. Onboard ground components 409, 438, or 462, on data processing systems, such as proxy server computer 410, maintenance laptop 434, and/or maintenance laptop 458, communicate with onboard electronic distribution system 446 on aircraft data processing system 444 in these examples. This type of software component provides an application program interface to the ground tool to uplink commands and aircraft software parts to aircraft 418 as well as downlinking data or files.

The illustration of particular components and configurations in network data processing system 400 are not meant to imply architectural limitations to the manner in which different embodiments may be implemented. For example, although only a single aircraft is shown in aircraft network 401, multiple aircraft may be present within aircraft network 401. As another example, airline network 408 in ground network 403 may connect to computers, such as proxy server computer 410, at airports, such as airport 414, through other types of networks other than Internet 412. For example, a wide area network (WAN) may be used in place of, or in conjunction with, Internet 412.

Figure 5:
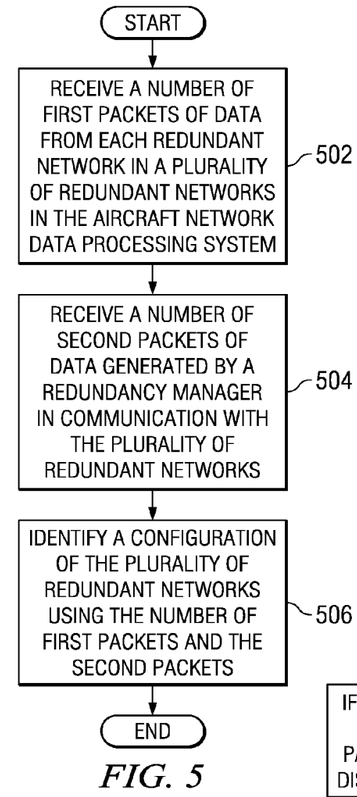
FIG. 5 is a flowchart of a process for processing packets in an aircraft network data processing system in accordance with an advantageous embodiment.

With reference now to FIG. 5, a flowchart of a process for processing packets in an aircraft network data processing system. This process may be implemented using network system 301 in FIG. 3.

The process begins by receiving a number of first packets of data from each redundant network in a plurality of redundant networks in the aircraft network data processing system (step 502). The number of first packets received from the plurality of redundant networks is received through one or more interface accumulators. Also, a number of second packets of data generated by a redundancy manager are received in communication with the plurality of redundant networks (step 504). Then, a configuration of the plurality of redundant networks is identified using the number of first packets and the number of second packets (step 506). Identifying is performed by identifying machine access control addresses of the number of first packets and the number of second packets. In different advantageous embodiments, identifying the configuration of the plurality of redundant networks may also be done by identifying virtual link identifiers, internet protocol addresses, packet header elements, and/or substantive data of the number of first and the number of second packets.

Figure 6:
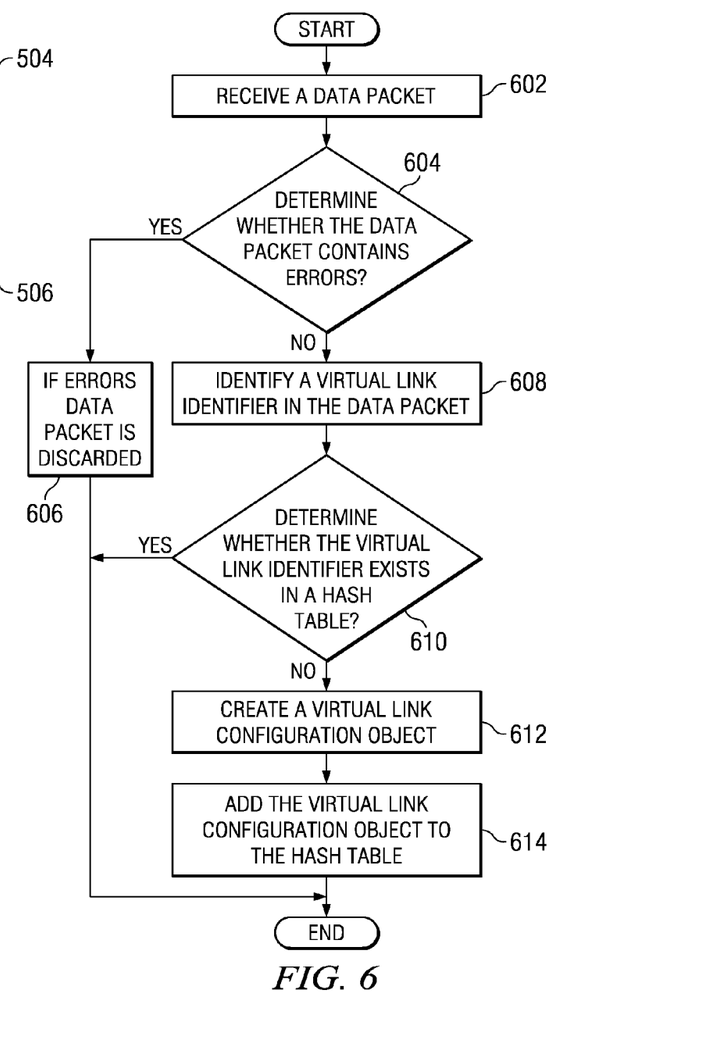
FIG. 6 is a flowchart of a process for determining a network configuration in accordance with an advantageous embodiment.

With reference now to FIG. 6, a flowchart of a process for determining a network configuration in an aircraft network data processing system. This process may be implemented using network system 301 in FIG. 3.

The process begins by receiving a data packet (step 602). The data packet may consist of a frame of data. A determination is made to whether the data packet contains errors (step 604). If there are errors, the data packet is discarded (step 606). If there are no errors, the virtual link identifier is identified in the data packet (step 608). The virtual link identifier is located in the machine access code address. Identifying the virtual link identifier in the data packet may be performed by filtering the protocol. For example, a Berkley Packet Filter may be used.

Once a virtual link identifier and machine access code address have been identified, a hash table is tested for a first occurrence of the virtual link identifier (step 610). A hash table is a data structure that uses a hash function to map keys to associated values. A hash function converts a large amount of data into a datum, a single integer that serves to index an array. For example, virtual link identifier "1234567891012131" may be associated with map key "right rudder." If the map key does not exist, a new virtual link configuration object is created (step 612). The virtual link configuration object comprises information such as the virtual link identifier, maximum and minimum frame size measured, and bandwidth allocation gap value. Also, the new identified virtual link is added to the hash table (step 614). An end system table may also be populated. A determination may then be made as to whether multiple end systems are using the same virtual link identifier.

Additionally, at the network layer, an internet protocol hash table may be created. The internet protocol address is comprised of a format aaa.bbb.ccc.ddd. The first section "aaa" may be a constant, such as "10". The second section "bbb" may be the end system equipment class. The third section "ccc" may be the end system position. The fourth section "ddd" may be the partition identifier, such as an integer from 0 to 255. Additionally, at the transport layer, a user datagram protocol hash table may be created. A destination user datagram protocol datagram object may be created and stored in the hash table. Each object at each layer, logical link, network, and transport may have statistical data objects. The statistics may be used by an application to extract information about a network to determine the configuration and usage of the network.

Additionally, when discovering the network, the end system, virtual link, internet protocol source address, user datagram protocol source port, user datagram protocol destination port, and internet protocol destination may be used to discover the network configuration.

The end system may be determined by a user defined identifier. In some advantageous embodiments, the user defined identifier may be referred to as two separate identifiers, the equipment class identifier and the equipment position identifier. The user defined identifier is 16 bits and indicates the equipment class and position. In other advantageous embodiments, the user defined identifier may comprise a different number of bits. If equipment class identifier and equipment position identifier are used, each would comprise 8 bits.

The internet protocol source address may be determined by a second user defined identifier and a partition identifier. A partition identifier indicates the number of virtual end systems at a physical end system.

The user defined identifier and the second user defined identifier may be compared and a determination made as to whether the identifiers are equal. If they are not, there may be an error in the data packet.

Additionally, the signature of the protocol may be checked for errors. One advantageous embodiment of the protocol checking comprises loose signature checks, strict signature checks, and consistency checks.

Loose signature checks are a user defined mode of the packet engine to filter data packets. The loose signature checks are the destination machine access code address at ether[0:4]==0x03000000; source machine access address at 1)ether[6:3]==0x020000, 2)ether[11:1]==0x20 or ether[11:1]==0x40; and type at ether[12:2]==0x0800. For example, the designation "ether[0:4}" refers to the data packet. The initial "0" refers to the offset starting at the source machine access code address, comprising 4 octets.

Strict signature checks are a user defined mode of the packet engine to filter data packets. Strict signature checks include loose signature checks. The strict signature checks are the internet protocol version and header length at ether[14:1]==0x45; internet protocol type of service at ether[15:1]==0x00; internet protocol time to live at ether[22:1]==0x01; internet protocol at ether[23:1]==0x01 or ether[23:1]==0x11; internet protocol source address at ether[26:1]==0x0a; and internet protocol destination address: ether[30:1]==0x0a or ether[30:2]==0xe0e0.

Strict signature checks also comprise consistency checks. The consistency checks are the virtual link if ether[30:2]==0xe0e0, then ether[4:2]==ether[32:2]; and the user defined identifier, ether[9:2]==ether[27:2].

Additionally, in some advantageous embodiments, a program associated with the network system through a socket layer determines whether one or more errors exist in the network. The one or more errors are at least one of a timeout, queue overrun, and reception of the plurality of packets from less than all of the number of networks. In other advantageous embodiments, the packets are only received from a subset of the plurality of packets and the managed plurality of packets based on a number of filter options.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, socket layer may be located in network system 301, but not packet engine 304 as in FIG. 3. As another example, redundancy manager 318 may be located in network layer 312 and/or transport layer 308 as in FIG. 3.

In one or more advantageous embodiments, the ability to access packets of data above or below the redundancy manager is provided. Further, the different advantageous embodiments also recognized that current software comprises a protocol stack tied to a specific hardware implementation. As a result, proprietary components and software are costly. The different advantageous embodiments provide for accessing a proprietary network system using generic commercial-over-the-counter network interface cards.

In one or more advantageous embodiments, the ability to identify misconfigurations in the network and spoofing is provided. Spoofing is when data packets contain incorrect source addresses.

The description of the different advantageous embodiments has been presented for the purpose of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Although the different advantageous embodiments have been described with respect to parts for aircraft, other advantageous embodiments may be applied to parts for other types of network systems. For example, without limitation, other advantageous embodiments may be applied to networks for spacecraft and/or any type of proprietary protocol stack.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for accessing an aircraft network data processing system via a network interface card, the method comprising:
 discovering a configuration of the network data processing system via:
  receiving a number of first packets of data from each redundant network in a plurality of redundant networks in the aircraft network data processing system;
  receiving, by a redundancy manager in communication with the plurality of redundant networks, a number of second packets of data;
  generating, by the redundancy manager, a managed plurality of packets using the number of first packets and the number of second packets; and
  identifying a configuration of the plurality of redundant networks using the managed plurality of packets via:
   testing a hash table for a virtual link within the managed plurality of packets to identify a presence of a map key;
   responsive to a lack of the map key, creating a virtual link configuration object, and adding information therefrom to the hash table;
   extracting information from statistical data objects within the hash table; and
   using the statistical data objects to discover the configuration of the network data processing system.

2. The method of claim 1, further comprising:
 determining whether a number of errors exist in the plurality of redundant networks.

3. The method of claim 2, wherein the number of errors is at least one of a timeout, queue overrun, and reception of the packets from less than all of the plurality of redundant networks.

4. The method of claim 1, wherein identifying the configuration of the plurality of redundant networks using the first packets and the second packets further comprises determining machine access control addresses of the number of first packets and the number of second packets.

5. The method of claim 1, wherein the plurality of redundant networks is received through a number of interface accumulators.

6. The method of claim 1, further comprising:
 selecting a subset of the number of first packets and the number of second packets based on a number of filter options.

7. The method of claim 6, further comprising:
 responsive to creating the virtual link configuration object, populating an end system table; and
 identifying the configuration of the plurality of redundant networks via using the virtual link configuration object comprising a virtual link identifier.

8. A non-transitory computer readable storage medium embedded with program code, which when executed by a processor, performs method steps of:
 discovering a configuration of a network data processing system via:
 receiving number of first packets of data from each redundant network in a plurality of redundant networks in an aircraft network system;
 receiving, by a redundancy manager in communication with the plurality of redundant networks, a number of second packets of data;

generating, by the redundancy manager, a managed plurality of packets using the number of first packets and the number of second packets; and identifying a configuration of the plurality of redundant networks using the managed plurality of packets based upon all of: virtual link identifiers, internet protocol addresses, packet header elements, and substantive data of the first packets and the second packets being accessible further:

testing a hash table for a virtual link within the managed plurality of packets to identify a presence of a map key;

creating a virtual link configuration object, in responsive to a lack of the map key, and add information therefrom to the hash table;

extracting information from statistical data objects within the hash table; and discovering the configuration of the network data processing system, based upon the statistical data objects.

9. The non transitory computer readable storage medium of claim 8, wherein the program code, which when executed by a processor, performs further method step of:

determining whether a number of errors exist in the plurality of redundant networks.

10. The non transitory computer readable storage medium of claim 9, wherein the number of errors is at least one of a timeout, queue overrun, and reception of the packets from less than all of the plurality of redundant networks.

11. The non transitory computer readable storage medium of claim 8, wherein the program code, which when executed by a processor, performs further method step of:

determining machine access control addresses of the number of first packets and the number of second packets.

12. The non transitory computer readable storage medium of claim 8, wherein the redundant networks is received through a number of interface accumulators.

13. The non transitory computer readable storage medium of claim 8, wherein the program code, which when executed by a processor, performs further method step of:

selecting a subset of the number of first packets and the number of second packets based on a number of filter options.

14. A method for detecting spoofing within a network data processing system, the method comprising:

discovering: an end system, a virtual link, an internet protocol source address, a user datagram protocol source port identifier, a user datagram protocol destination port identifier, and an internet protocol destination address, for a data network via discovering a configuration for the data network via:

receiving a number of first packets of data from each redundant network in a plurality of redundant networks in the network data processing system;

receiving, by a redundancy manager in communication with the plurality of redundant networks, a number of second packets of data:

generating, by the redundancy manager, a managed plurality of packets using the number of first packets and the number of second packets; and identifying a configuration of the plurality of redundant networks using the managed plurality of packets.

15. The method of claim 14, further comprising identifying the configuration of the plurality of redundant networks via:

testing a hash table for the virtual link within the managed plurality of packets to identify a presence of a map key;

responsive to a lack of the map key, creating a virtual link configuration object, and adding information therefrom to the hash table;

extracting information from statistical data objects within the hash table; and using the statistical data objects to discover the configuration of the network data processing system.

16. The method of claim 14, further comprising identifying misconfigurations in the network data processing system.

* * * * *